March 24, 1931.  E. C. BURR  1,797,319
LIFTING ATTACHMENT FOR HARROWS
Filed June 2, 1928  4 Sheets-Sheet 1
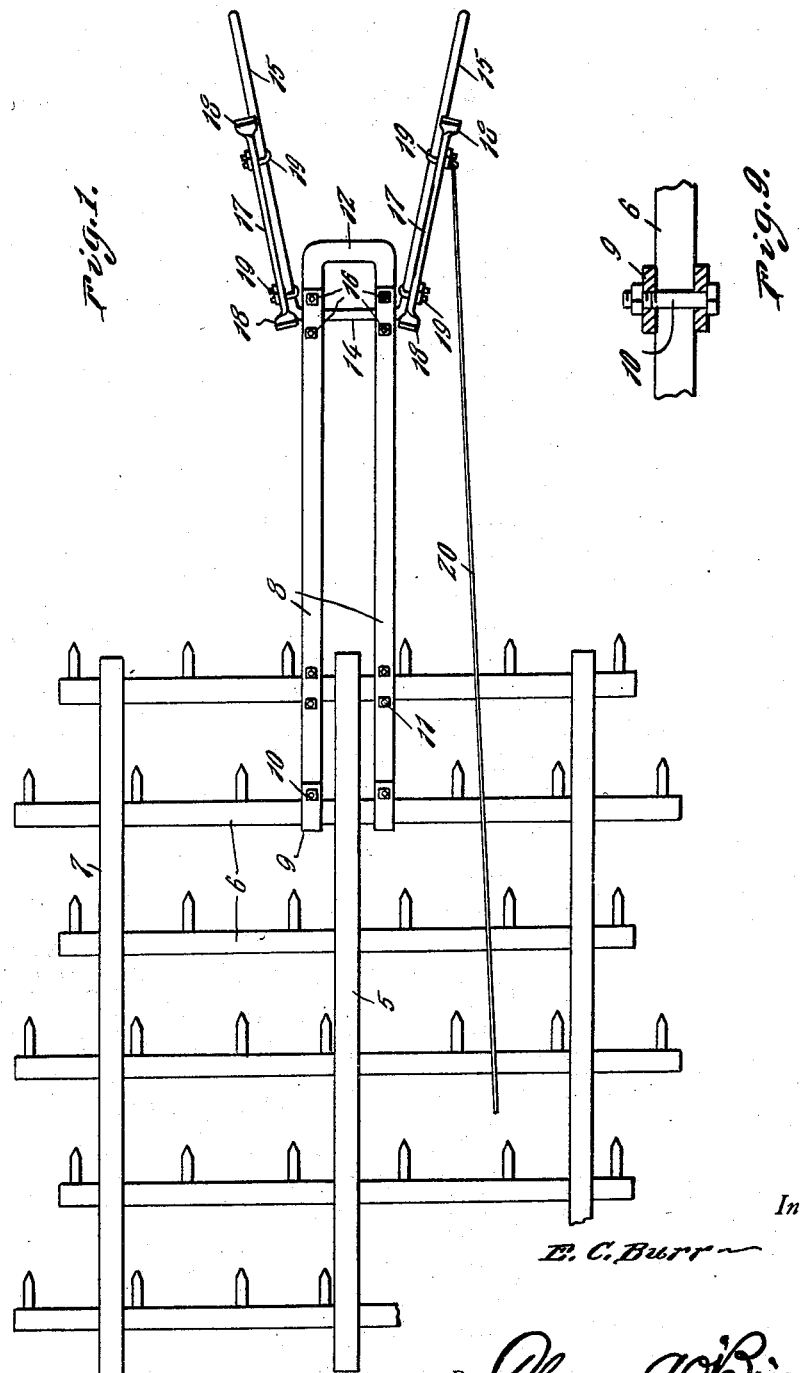
Inventor
E. C. Burr
By Clarence A. O'Brien
Attorney

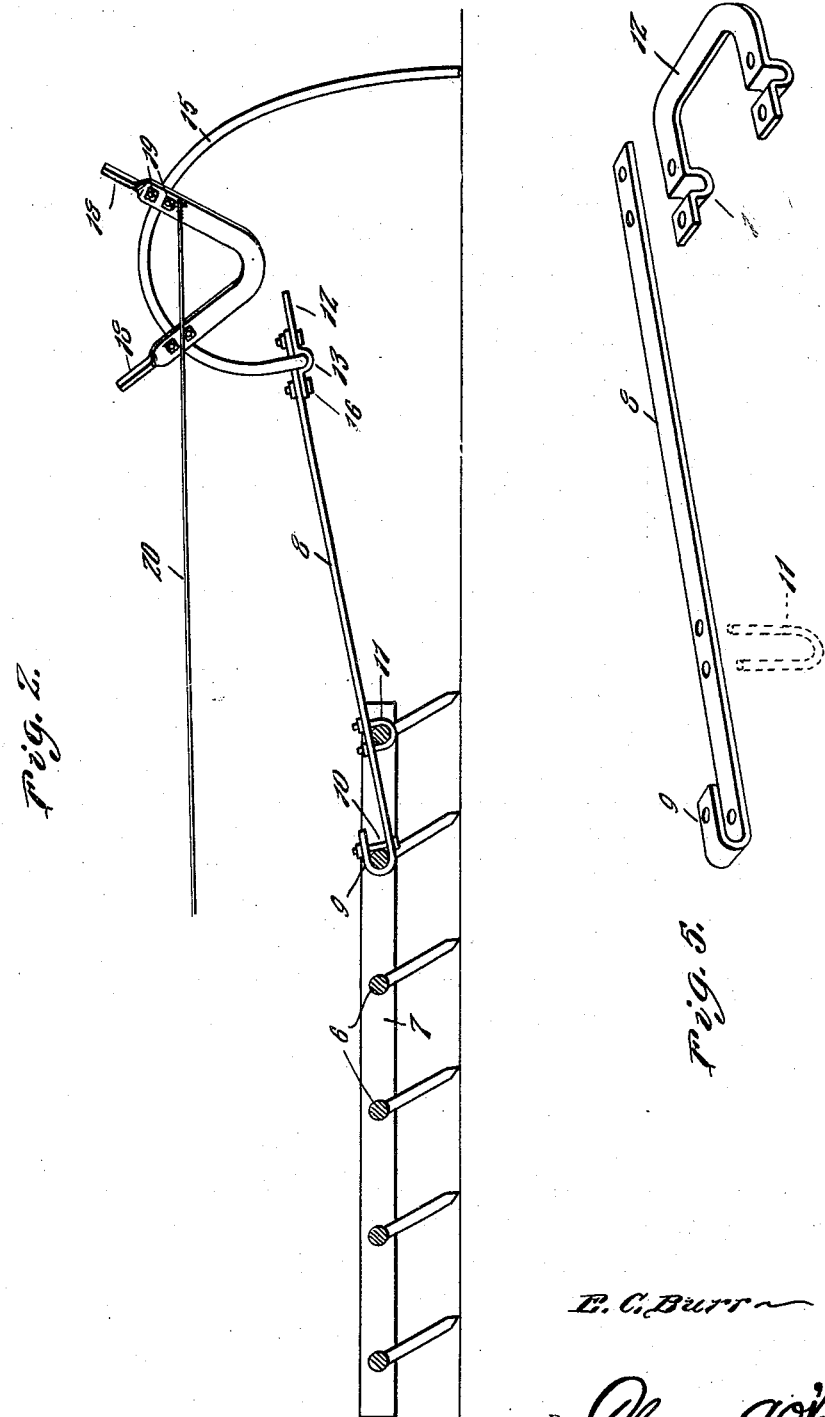

March 24, 1931.  E. C. BURR  1,797,319
LIFTING ATTACHMENT FOR HARROWS
Filed June 2, 1928  4 Sheets-Sheet 3
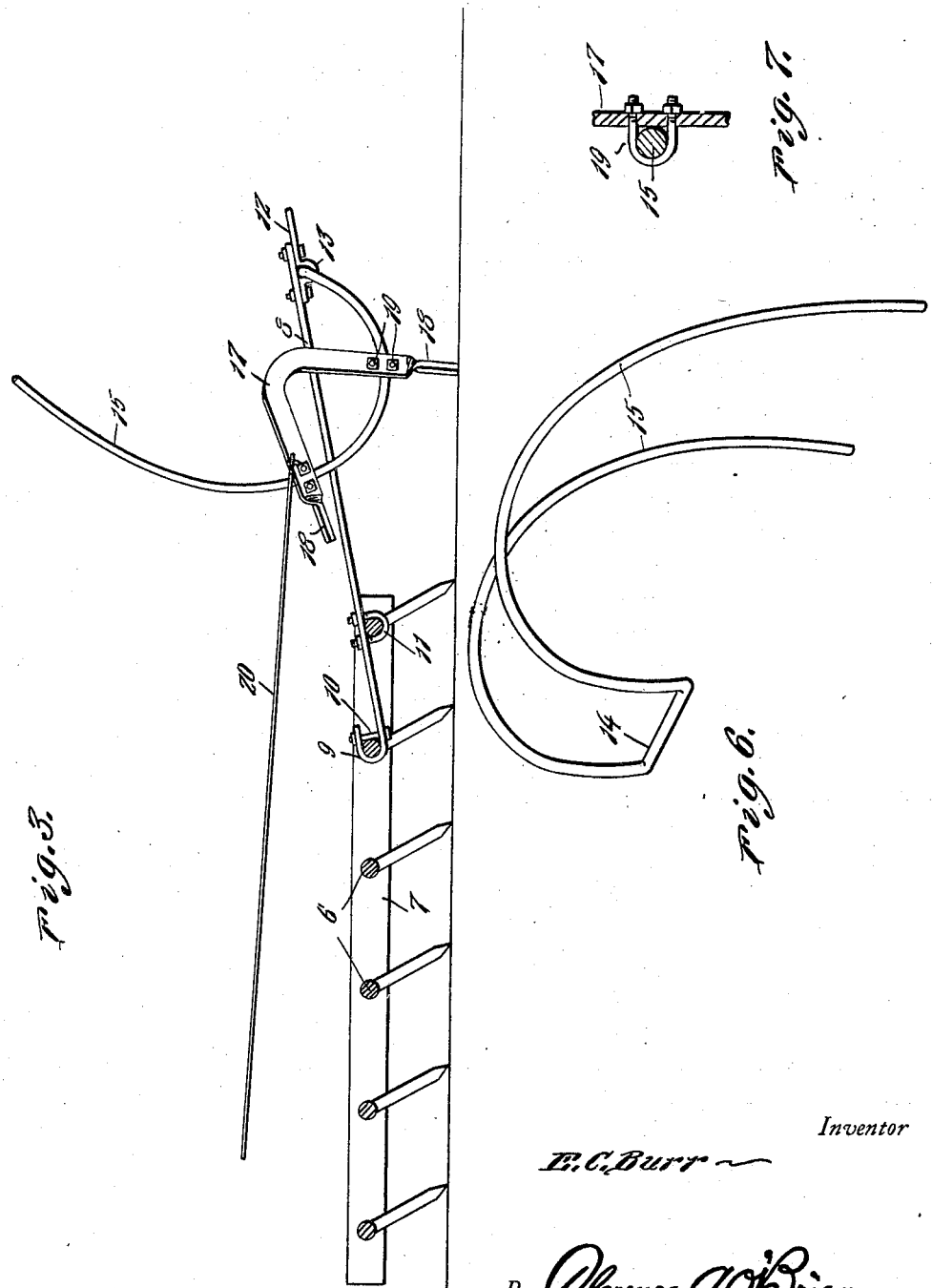
Inventor
E. C. Burr
By Clarence A. O'Brien
Attorney

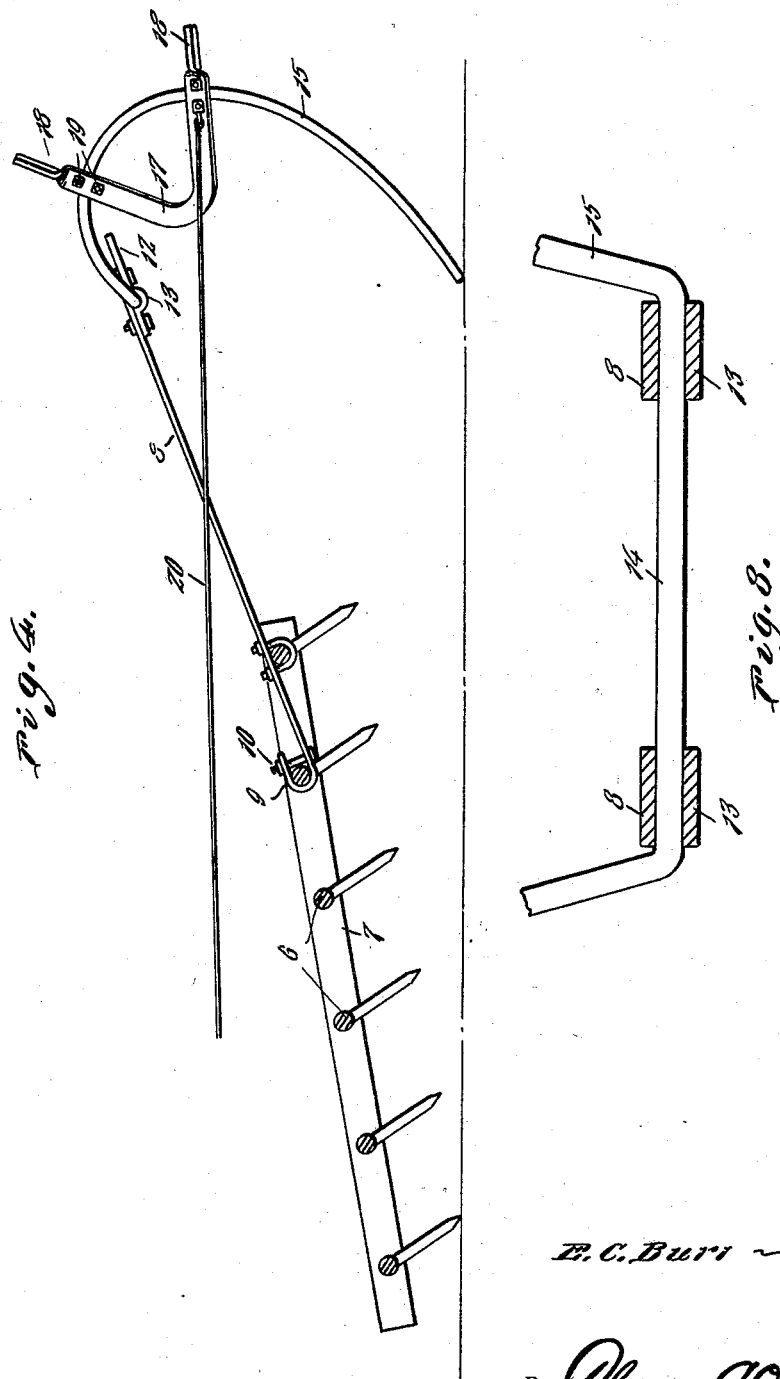

Patented Mar. 24, 1931

1,797,319

UNITED STATES PATENT OFFICE

EDWARD C. BURR, OF SALINA, KANSAS

LIFTING ATTACHMENT FOR HARROWS

Application filed June 2, 1928. Serial No. 282,312.

This invention relates to harrow attachments and has for its principal object to provide means for lifting the harrow, when desired, in order to permit the trash or other material collected by the harrow teeth during the operation thereof to be removed from the harrow.

A further object of the invention is to provide an attachment of this character which is operable by the operator of the harrow while in motion and without interrupting the continuous operation of the harrow.

A still further object is to provide an attachment of this character of a simple and practical construction, which is neat and attractive in appearance, strong and durable, which may be easily and quickly attached in position to the harrow, without necessitating any change in the construction thereof, which is relatively inexpensive to manufacture, and otherwise well adapted for the purpose for which the same is intended.

Other objects and advantages reside in the special construction and combination of the various elements comprising the invention, reference being had to the accompanying drawings, forming a part hereof, wherein:

Figure 1 is a top plan view showing the device in operative position upon the harrow.

Figure 2 is a side elevational view of the attachment with the harrow shown in longitudinal section and illustrating the position of the attachment when not used for lifting the harrow.

Figure 3 is a similar view illustrating the position of the attachment after being initially moved into position in advance of the lifting operation.

Figure 4 is a similar view, showing the manner in which the attachment operates to lift the harrow from the ground.

Figure 5 is a group perspective view of the attaching rods for securing the attachment to the harrow.

Figure 6 is a perspective view of the lifting fork.

Figure 7 is a transverse sectional view through one of the harrow tooth supporting rods and illustrating the U-bolts provided for attaching the extension rod for the attachment thereto.

Figure 8 is a fragmentary sectional view through the supporting bearing for pivotally attaching the lifting fork, and Figure 9 is a sectional view through the hook shaped end of one of the extension rods.

Referring now to the drawing in detail, wherein for the purpose of illustration I have disclosed the preferred embodiment of my invention, the numeral 5 designates a harrow of conventional construction having a series of spaced parallel harrow tooth supporting rods 6, carried by the harrow frame 7. Extending rearwardly from the harrow, at approximately the center thereof is a pair of spaced apart extension rods 8 having their forward ends each with a hook 9, disposed about one of the tooth supporting rods 6, and secured thereto by a bolt 10. The forward ends of the extension rods 8 are disposed under the next to the last tooth supporting rod 6 and over the rearmost supporting rod 6, as clearly illustrated in Figures 2, 3, and 4 of the drawings. The rods 8 are secured to the rearmost tooth supporting rod 6, by a U-shaped bolt 11. The extension rods 8 are thus arranged at an upwardly and rearwardly extending angle and have their rear ends connected by a horizontally disposed U-shaped bracket 12. The bracket 12 has a portion adjacent its ends formed into a transversely extending groove 13, into which is seated the bight portion 14 of a U-shaped gripping lifting fork 15, having its sides or arms or legs extending outwardly from each side of the grooves 13 in the bracket, the brackets having the grooves thereof forming a bearing support for the bight portion of said lifting fork.

The rear ends of the extension rods 8 are attached to the bracket 12, by bolts 16, and extend over the grooves 13 so as to retain the bight portion of the lifting fork in said grooves. The parallel ends of the lifting fork 15 are of an arcuate shaped formation curved in a line which is eccentric to the axis of the bight portion and intermediate the ends of each is attached a V-shaped member 17, with its ends extending in a direction outwardly from the outer curve of the ends of said lifting fork. The ends of the V-shaped member 17 extend beyond the edge of the lifting fork and form means 18, for engagement with the ground, in a manner as illustrated in Figure 3 of the drawing, for a purpose as will be hereinafter more fully explained.

The sides of the V-shaped member 17 are attached to the sides of the lifting fork by U-bolts 19. To the end of one of the V-shaped members 17, adjacent the extreme end of the lifting fork 15 is attached one end of the operating cable 20, extending forwardly of the harrow to a position for operation by the driver of the tractor or other device for drawing the harrow. The attachment of the V-shaped members acts as a brace to preserve the curvature of the free ends of the lifting member under conditions of strain thereupon.

With the parts assembled in the manner indicated, and in the normal operation of the harrow, the ends of the lifting fork 15 will drag along the ground rearwardly of the teeth of the harrow, as illustrated in Figure 2 of the drawings.

When the teeth of the harrow collect an accumulation of trash or other material during their movement over the ground, it is desired to move the same therefrom, the cable 20 is pulled forwardly by the operator, thereby raising the ends of the lifting fork upwardly and permitting one of the teeth 18 of the V-shaped member 17 to engage the ground. The continued forward movement of the harrow will cause the feet 18 to drag toward the rear, thus continuing to rotate the lifting fork within the grooves 13 of the bracket 12, until the feet 18 drag toward their rearmost position, whereupon the arcuate shaped portion of the lifting fork will glide upon the ground and gradually lift the rear end of the extension rods 8, and as a consequence, the rear portion of the arrow upwardly until the ends of the lifting fork are dragged rearwardly beyond the position shown in Figure 4, whereupon the harrow will be permitted to drop again to its normal position.

It is obvious that the invention is susceptible of various changes and modifications, without departing from the spirit or scope of the invention or sacrificing any of its advantages, and I accordingly claim all such forms of the device, to which I am entitled.

I claim:

1. A lifting attachment for harrows comprising a pair of rigid spaced apart rods extending rearwardly from the harrow, with their forward ends attached thereto, a bearing bracket carried at the rear ends of said rods, a U-shaped lifting fork rotatably supported intermediate its ends upon said bracket, said fork having its parallel arms arranged in an arcuate formation and with their ends adapted to normally drag over the ground rearwardly of the harrow, a pair of feet extending outwardly from the arcuate portion of said fork in spaced relation, and means operable from a position forwardly of the harrow for moving the fork forwardly in advance of the bracket, whereby to bring the feet into engagement with the ground, and subsequently dragging the fork rearwardly whereby to cause the harrow to ride upon the arcuate portion of the fork and temporarily lift the harrow from the ground.

2. A lifting attachment for a harrow comprising a support attachable to the harrow to extend rearwardly therefrom, a U-shaped lifter element for lifting the rear end of the harrow having its bight portion pivoted on the rear end of said support and its legs curved throughout their length in an arc eccentric to the longitudinal axis of the bight portion so that the radius of curvature increases toward the free ends of the legs whereby to cause a gradual elevation of the harrow when the lifting member is drawn over the ground, and a plurality of spaced apart feet on the legs of the lifter element, and a body interconnecting said feet and forming braces for maintaining the curvature of the said legs.

3. A lifting attachment for a harrow comprising a support attachable to the harrow to extend rearwardly therefrom, a U-shaped lifter element for lifting the rear end of the harrow pivotally connected at its bight portion to the rear end of said support, the legs of said lifter element being continuously and decreasingly curved toward their free ends whereby a gradual elevation of the harrow may result from drawing the lifter element over the ground, and a plurality of feet secured in spaced relation to the legs of the lifter element adapted to engage the ground and cause the rotation of the lifter element to bring the free ends of its legs into contact with the ground, a body connecting the inner ends of said feet whereby to constitute a brace for maintaining the curvature of the legs.

In testimony whereof I affix my signature.

EDWARD C. BURR.